(12) United States Patent
Tang et al.

(10) Patent No.: US 9,654,938 B2
(45) Date of Patent: May 16, 2017

(54) METHOD AND SYSTEM FOR MANAGING MOBILE AND PORTABLE TWO-WAY RADIO COLLABORATION

(71) Applicant: MOTOROLA SOLUTIONS, INC, Schaumburg, IL (US)

(72) Inventors: Xiao-Ping Tang, Chengdu (CN); Mengge Duan, Chengdu (CN); Jian Han, Chengdu (CN); Liang Xu, Chengdu (CN)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/025,582

(22) PCT Filed: Nov. 28, 2013

(86) PCT No.: PCT/CN2013/088078
§ 371 (c)(1),
(2) Date: Mar. 29, 2016

(87) PCT Pub. No.: WO2015/077967
PCT Pub. Date: Jun. 4, 2015

(65) Prior Publication Data
US 2016/0269877 A1    Sep. 15, 2016

(51) Int. Cl.
*H04W 4/10*    (2009.01)
*H04W 4/00*    (2009.01)
(Continued)

(52) U.S. Cl.
CPC ............ *H04W 4/10* (2013.01); *H04W 4/008* (2013.01); *H04W 76/005* (2013.01);
(Continued)

(58) Field of Classification Search
None
See application file for complete search history.

(56) References Cited

U.S. PATENT DOCUMENTS 6,311,052 B1    10/2001    Lenz
7,349,355 B2    3/2008    Sengupta et al.
(Continued)

FOREIGN PATENT DOCUMENTS

AU    2012203969 A1    7/2012
CA    2798802 A1    11/2011
(Continued)

OTHER PUBLICATIONS

The International Search and the Written Opinion, PCT/CN2013/088078, filed: Nov. 28, 2013, mailed Sep. 16, 2014, all pages.

*Primary Examiner* — David Bilodeau
(74) *Attorney, Agent, or Firm* — Daniel R. Bestor

(57) ABSTRACT

A method and apparatus for collaboration among two-way radio devices allows a portable two-way radio device and a mobile two-way radio device to each enter into a collaboration mode while the are paired with each other over a short range wireless radio network. While in the collaboration mode, when the user keys the portable two-way radio device audio is routed from the portable two-way radio device to the mobile two-way radio device over the short range wireless network and the mobile two-way radio device transmits the audio on behalf of the portable two-way radio device.

20 Claims, 10 Drawing Sheets

(51) Int. Cl.
*H04W 76/00* (2009.01)
*H04W 76/02* (2009.01)
*H04W 84/08* (2009.01)
*H04W 88/04* (2009.01)
*H04B 1/3822* (2015.01)
*H04B 1/3827* (2015.01)
*H04W 84/12* (2009.01)
*H04W 84/18* (2009.01)

(52) U.S. Cl.
CPC ............ *H04B 1/385* (2013.01); *H04B 1/3822* (2013.01); *H04W 76/023* (2013.01); *H04W 84/08* (2013.01); *H04W 84/12* (2013.01); *H04W 84/18* (2013.01); *H04W 88/04* (2013.01)

(56) References Cited

U.S. PATENT DOCUMENTS

| | | |
|---|---|---|
| 8,989,167 B2 | 3/2015 | Namm |
| 2008/0171567 A1 | 7/2008 | Kossi et al. |
| 2008/0261529 A1 | 10/2008 | Rosenblatt |
| 2010/0279647 A1 | 11/2010 | Jacobs et al. |
| 2010/0313701 A1 | 12/2010 | Lu |
| 2011/0034125 A1* | 2/2011 | Preston ............... H04M 1/6066 455/41.2 |
| 2011/0053582 A1* | 3/2011 | Mueck ................. H04W 48/14 455/419 |
| 2011/0237287 A1 | 9/2011 | Klein et al. |
| 2011/0287719 A1* | 11/2011 | Pinder ................ H04M 1/6091 455/41.3 |
| 2013/0102250 A1 | 4/2013 | Mutikainen et al. |
| 2013/0316755 A1* | 11/2013 | Wang ..................... H04W 4/10 455/518 |
| 2013/0322424 A1* | 12/2013 | Fraser ............... H04W 72/0446 370/343 |

FOREIGN PATENT DOCUMENTS

| | | |
|---|---|---|
| CN | 2157631 Y | 2/1994 |
| WO | 2012074826 A2 | 6/2012 |
| WO | 2013032453 A1 | 3/2013 |

* cited by examiner

METHOD AND SYSTEM FOR MANAGING MOBILE AND PORTABLE TWO-WAY RADIO COLLABORATION

"This application is a National Stage filing under 35 U.S.C §371 of co-pending Patent Cooperation Treaty international application having Serial No. PCT/CN2013/088078 (the 'PCT international application') filed on Nov. 28, 2013. This application claims priority to the PCT international application, the entire contents of which are incorporated herein by reference."

FIELD OF THE DISCLOSURE

The present disclosure relates generally to two-way radios and systems, and more particularly to collaboration between a portable two-way radio device and a mobile radio device used by a common user.

BACKGROUND

Two-way radio communication has long been the favored means of communicating in organizations like police, public safety, fire response, rescue, and military, as well as some commercial settings such as vehicle fleet and industrial operations. Two-way communication remains popular because it provides nearly immediate communication; when a radio operator presses the transmit button, more well known as "push to talk," a modem two-way radio device makes a quick check of the channel to ensure it is not in use, and alerts the operator with a "talk permit" sound, whereupon the operator can begin talking and the operator's voice is concurrently transmitted to all other radio devices monitoring the channel. Other two-way radio devices operating on the same channel as a receiving device simply unmute their speaker and play the received audio over the speaker at as volume setting selected by the radio's operator. In this way radio operators do not have to do anything to hear the transmission, assuming they set their radio device's volume at an appropriate level for the ambient conditions.

Modem two-way communication device are designed primarily in two forms; a portable device and a mobile device. The portable device is a battery powered device that can be worn on an operator's body and carried by the operator, and has a small antenna that is coupled directly (typically screwed in) to the portable device. A mobile device is mounted in a vehicle and is coupled to an antenna mounted on the outside of the vehicle, and has a substantially higher transmission power than a portable device. It is common for a given operator to use both a portable and a mobile device. For example, police officers often respond to calls and patrol areas in a vehicle, and will occasionally exit the vehicle to engage in various tasks. While in the vehicle the mobile device is used, and while away from the vehicle the operator relies on the portable device to receive and engage in communications.

Having both a portable and a mobile device can lead to some issues, as well as opportunities. If the mobile and portable are both set to the same channel setting, then the operator must reduce the volume of one device when they are in close proximity since the audio received by the non-transmitting device will feed back into the device being used to transmit. However, having both a portable and a mobile device allow the operator to monitor more channels compared to having only a single two-way radio device. By setting the devices on different channel settings, the feedback issue is avoided, but in some circumstances the portable device may not have a strong enough signal to reliably reach a repeater or other base station so that others can hear the operator speaking on the channel to which the portable device is set.

Accordingly, there is a need for a method and apparatus for allowing collaboration between a portable and mobile two-way radio devices that avoid these problems while allowing the advantages of having access to more than one two-way radio device.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
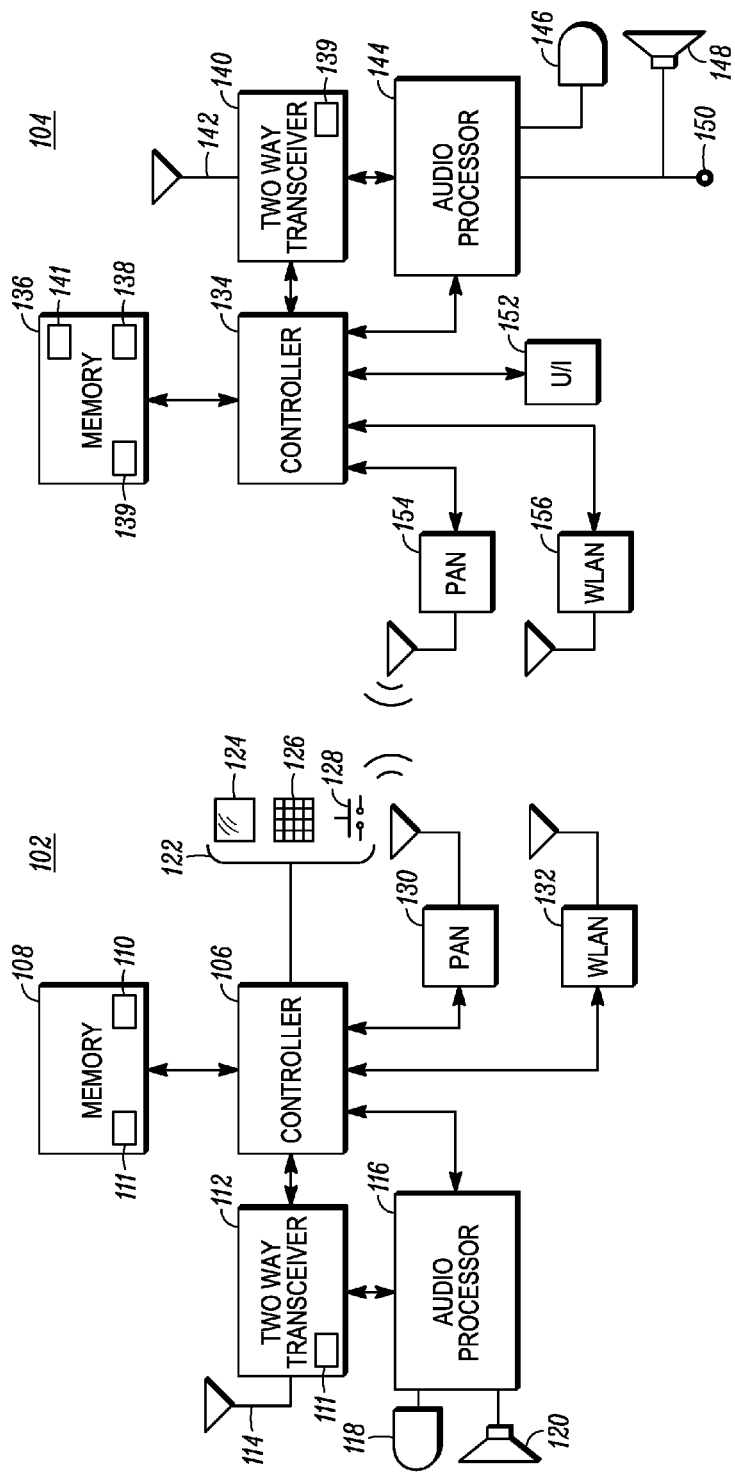
FIG. 1 is a block, diagram of as portable two-way radio device and a mobile two-way radio device operating in collaboration in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Embodiments of the disclosure include a method for collaboration among two-way radio devices. In particular the collaboration is between a portable two-way radio device and a mobile two-way radio device. The method includes pairing a mobile two-way radio device and a portable two-way radio device over a short range wireless network link. Upon being paired, the method further includes detecting a push to talk (PTT) event at the portable two-way radio device, and transmitting a PTT request from the portable two-way radio device to the mobile two-way radio device over the short range wireless network link in response to detecting the PTT event. The method further includes receiving a PTT grant at the portable two-way radio device from the mobile two-way radio device over the short range wireless network link in response to transmitting the PTT request, in response to receiving the PTT grant, the portable two-way radio device provides a talk permit alert, opens a microphone receive path, and routes audio received via the microphone receive path to the mobile two-way radio device over the short range wireless network link. The mobile two-way radio device transmits the audio using a channel setting of the portable two-way radio device. The channel setting of the portable two-way radio device is different than a channel setting of the mobile two-way radio device.

FIG. 1 is a block diagram of a system 100 of portable two-way radio device 102 and a mobile two-way radio device 104 operating in collaboration, in accordance with some embodiments. The portable two-way radio device 102 includes a controller 106 that can be a microcontroller or microprocessor that executes instruction code that is designed to cause the portable two-way radio device 102 to provide a desired functionality and operation. The controller 106 is coupled to one or more memory devices represented by memory 108. Memory 108 can represent an aggregate memory that includes read only memory (ROM), random access memory (RAM), and other forms of memory. Stored and/or instantiated in memory is a collaboration application 110 that causes the portable two-way radio device 102 to operate in a collaboration mode with the mobile two-way radio device 104. Also stored in the memory is a channel setting 111 that can be provided to a portable two-way radio transceiver 112 that is coupled, and responsive to the controller 106. The portable two-way radio transceiver 112 includes the radio circuitry to carry out two-way radio operation, including frequency synthesis, modulation, demodulation, amplification, and filtering. The portable two-way transceiver 112 is coupled to an antenna 114 to transmit and receive radio signals over the air. The controller 106 provides the channel settings 111 to the portable transceiver 112, which then sets the frequency synthesis circuitry to generate appropriate frequencies to monitor, receive, and transmit. The channels settings 111 can indicate particular frequencies, but also particular talk groups to be monitored or scanned as well. The controller 106 and portable two-way radio transceiver 112 are coupled to an audio processor 116 which converts received analog audio from a microphone 118 to digital audio drat is provided to the portable two-way transceiver 112. Likewise, digital audio received front the portable two-way radio transceiver 112 is converted to analog audio signals and played over, for example, a loudspeaker 120. Several user interface elements 122 are coupled to or interfaced with the controller 106, and can include a graphical display 124 for visually displaying information, a keypad and other buttons, knobs, and selectors 126 for inputting information and settings, and a push to talk (PTT) button 128 for controlling PTT operation.

Also operating under control of the controller 106 is one or more short range wireless transceivers. For example, a personal area network (PAN) transceiver 130 can provide wireless connectivity in accordance with specifications in the Institute of Electrical, and Electronics Engineers (IEEE) 802.15 group of standards. These include the commercial standard known by the trade name "BlueTooth." Another short range wireless transceiver that can be included in the portable two-way radio device 102 is a wireless local area network (WLAN) transceiver 132, which can operate under one or more of the IEEE 802.11 standards. Typically a pan transceiver 130 is used for wireless interconnections or links with other devices, whereas a WLAN transceiver 132 is used for data services, although it can also be used to connect directly to other devices.

The mobile two-way radio device 104 contains comparable components, including a controller 134 and memory 136. The memory contains instruction code that is executed or performed by the controller 134 and includes a portion of code for a collaboration application 138. The memory can also store a mobile channel setting 139 that indicates the channel or channels, talk groups, and other logical partitions of the wireless radio media. The memory can also contain a proxy table 141 for storing proxy sessions for the portable two-way radio device 102 when the mobile two-way radio device 104 is operating in a collaboration mode with the portable two-way radio device 102. The controller 134 is coupled to a mobile two-way transceiver 140 that can store a local copy of the channel settings 139, and is coupled to a mobile antenna 142, which can be remotely mounted from an enclosure or housing containing the other elements and components of the mobile two-way radio device 104. The mobile two-way radio device 104 can further include an audio processor 144 coupled to a microphone 146 and loudspeaker 148 and an audio connection 150 for routing audio signals through an audio system of a vehicle in which the mobile two-way radio device 104 is mounted. User interface elements 152 can include a display and buttons for inputting information and settings. The mobile two-way radio device 104 further includes one or more short range wireless transceivers, such as a PAN transceiver 154 and/or a WLAN transceiver 156.

Using the pan transceiver 154, for example, the mobile two-way radio device 104 can "pair" or establish a wireless link with another device, such as the portable two-way radio device 102, over the PAN transceiver 130 of the portable two-way radio device 102. To pair, the devices 102, 104 communicate using their respective PAN transceivers 130, 154, or other short range wireless communication means, and exchange information identifying each other. Typically, at an initially pairing, the devices are paired using a manual process and each create a local record so that future pairings can occur automatically. According to the embodiments, upon pairing, the portable two-way radio device 102 and mobile two-way radio device 104 can operate in a collaboration mode where audio from the portable two-way radio device 102 can he routed over the PAN link to the mobile two-way radio device 104 for proxy transmission b the mobile two-way radio device 104. Thus, the operator of the portable two-way radio device 102 operates the portable two-way radio device 102 normally, pressing the PTT button 128 to talk, but the portable two-way radio device 102, rather than route audio from the microphone 118 to the portable two-way transceiver 112, routes the audio over the PAN link to the mobile two-way radio device 104 for proxy transmission, assuming the mobile two-way radio device 104 has given the portable two-way radio device 102 permission to commence talking.

Figure 2:
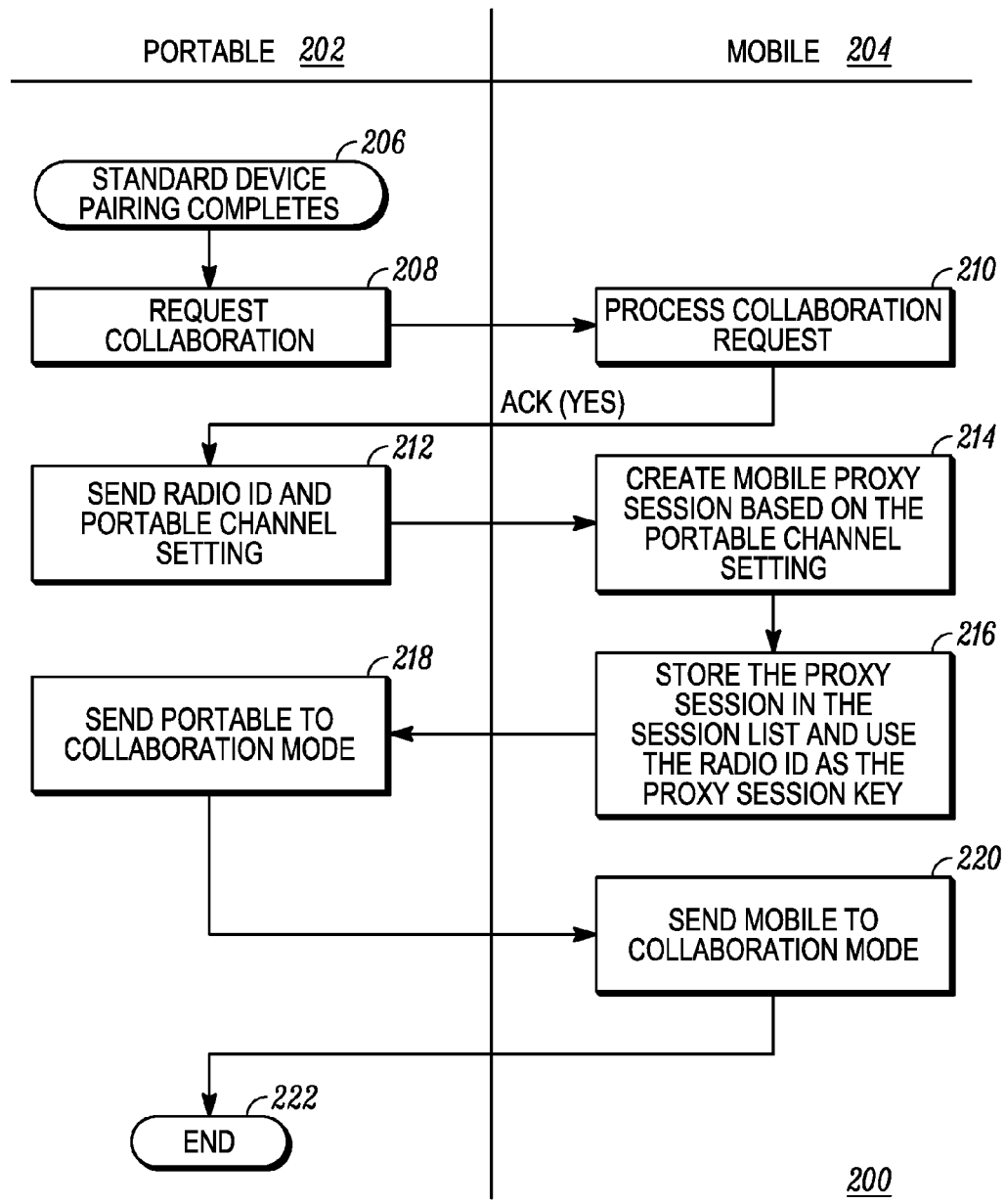
FIG. 2 is a flowchart of a method of collaborating between a portable two-way radio device and a mobile two-way radio device in accordance with some embodiments.

FIG. 2 is a flowchart of a method 200 of collaborating between a portable two-way radio device 202 and a mobile two-way radio device 204 in accordance with some embodiments. The flowchart, is divided to show in which device 202, 204 the various steps or processes occur. This format convention will be used throughout the disclosure and in subsequent limes. At step 206 a standard device pairing occurs between the devices 202, 204 over a short range wireless radio link, which can be, for example, a BlueTooth link. At step 208 the portable two-way radio device 202 requests collaboration mode of the mobile two-way radio device 204. The mobile two-way radio device 204 processes the collaboration request at step 210. Assuming the mobile two-way radio device 204 can support collaboration operation, it will provide a positive response to the portable two-way radio device 202. In step 212, responsive to the positive response, the portable two-way radio device 202 transmits its radio identifier and its channel setting to the mobile two-way radio device 204. In step 214 the mobile two-way radio device 204 creates a proxy session based on radio identifier and channel setting of the portable two-way radio device 202. The proxy session can be stored h the mobile two-way radio device 204, and the radio identifier of the portable two-way radio device 202 can be used as proxy session key for future reference in step 216. The mobile two-way radio device 204 can then indicate success and collaboration readiness to the portable two-way radio device 202. Accordingly, in steps 218 and 220 the portable two-way radio device 202 and the mobile two-way radio device 204 can respectively set themselves for collaboration operation and the method ends 222. At the end 222, each of the devices 202, 204 are ready to operate in collaboration mode. It is assumed through steps 208-222 that the devices remain paired over the short range wireless radio network, and that they remain paired thereafter, since collaboration operation requires the link over the short range wireless radio network.

Figure 3:
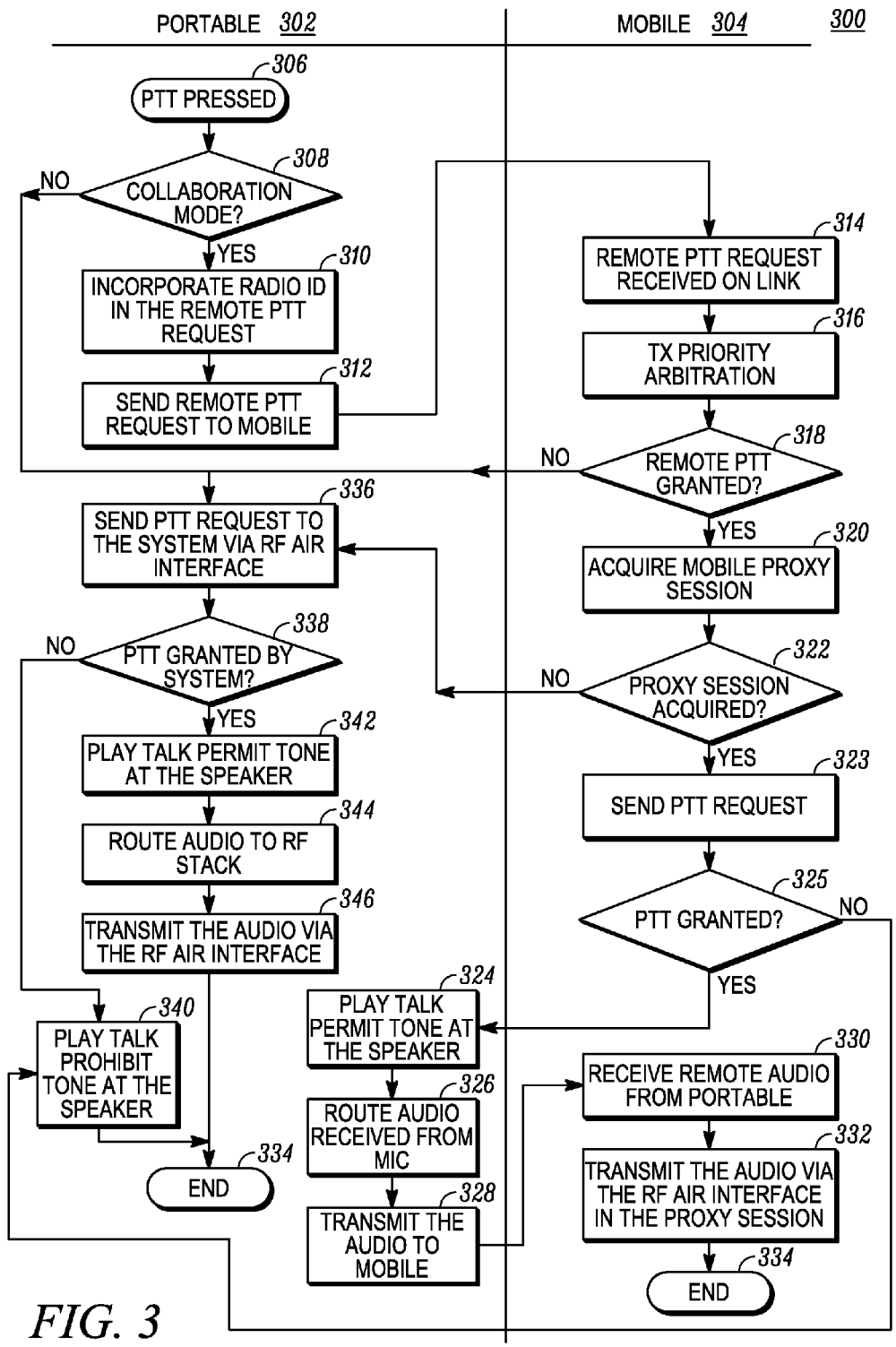
FIG. 3 is a flowchart of a method of handling a portable PTT event while collaborating between a portable two-way radio device and a mobile two-way radio device in accordance with some embodiments.

FIG. 3 is a flowchart of a method 300 of handling a portable PTT event while collaborating between a portable two-way radio device 302 and a mobile two-way radio device 304 in accordance with some embodiments. The method 300 assumes that a method substantially in accordance with that shown in FIG. 2 has been performed and that the device 302, 304 are presently paired over the short range wireless radio network. At step 306 the PTT button on the portable two-way radio device 302 is pressed by the operator, and is held pressed for the remainder of the method 300. A check can be made to determine whether the portable two-way radio device is operating in collaboration mode in step 308. Assuming the portable two-way radio device 302 is operating in collaboration mode, the method 300 proceeds to step 310 where the portable two-way radio device 302 forms a PTT request that can include the portable two-way radio device radio identifier. In step 312 the portable two-way radio device 302 transmits the PTT request to the mobile two-way radio device 304. In step 314 the mobile two-way radio device 304 receives the PTT request and in response performs a transmit priority arbitration process in step 316 to determine whether the mobile two-way radio device 304 can presently accommodate the PTT request, The result of step 316 is evaluated in step 318; if the portable PTT request 318 can be granted by the mobile, the method 300 proceeds to step 320 where the mobile two-way radio device 304 can acquire the proxy session information using the radio identifier of the portable two-way radio device 302. In step 322 the method 300 can check to ensure that there is proxy session information for the portable two-way radio device 302. In step 323, assuming the proxy session information is available, the mobile two-way radio device changes to work in a proxy session mode, where the mobile two-way transceiver is changed from the mobile channel setting to the portable channel setting, and the mobile two-way radio device transmits the PTT transmit request to the system over the air interface and waits the system response for further operations. In step 325, if the PTT transmit request is granted by the system, the mobile two-way radio device can transmit a grant in response to the PTT request to the portable two-way radio device and in response, in step 324 the portable two-way radio device 302 can alert the operator to commence talking by, for example, playing a talk permit tone. Thereafter the portable two-way radio device 302 opens the microphone line and routes audio signals (in digital form) in step 326 to the short range wireless radio transceiver, which transmits the audio to the mobile two-way radio device 304 in step 328. In step 330 the mobile two-way radio device 304 receives the audio from the portable two-way radio device 302 over the short range wireless radio network, and in step 332 the mobile two-way radio device 304 transmits the audio via the mobile two-way transceiver, using the portable two-way radio device proxy information, which indicates the channel setting of the portable two-way radio device 302 that is to he used by the mobile two-way radio transceiver while proxy transmitting for the portable two-way radio device 302. That is, the mobile two-way transceiver is changed from the mobile channel setting to the portable channel setting while transmitting the audio from the portable two-way radio device 302.

If in step 308 the portable two-way radio device is not in collaboration mode, or in step 318 if the mobile two-way radio device 304 cannot accommodate the PTT request, or if in step 322 if there is no proxy session information (e.g. the method 200 of FIG. 2 has not been performed), then the method 300 proceeds to step 336 where the portable two-way radio device 302 transmits the PTT request to the system using the portable two-way radio transceiver. In step 338 the portable two-way radio device 302 determines whether a grant or permission has been given by the system to transmit. Assuming a grant has been received, the method proceeds to step 342 where the portable two-way radio device 302 alerts the operator to commence talking by, for example, playing a talk permit tone. In step 342 the portable two-way radio device 344 routed the audio from the microphone internally to the portable two-way radio transceiver, in some embodiments the audio can be routed to a RF stack that is used by the portable two-way radio transceiver. In step 346 the audio can be transmitted by the portable two-way radio transceiver via the RF interface (e.g. antenna). If in step 338, the system does not grant the PTT request, or simply does not respond within some time limit, the portable two-way radio device 302 can play a talk prohibit tone in step 340, indicating to the operator that the operator's voice will not be transmitted, if in step 325, the PTT transmit request is not granted by the system or simply does not respond within some time limit, the portable two-way radio device 302 can play a talk prohibit tone in step 340, indicating to the operator that the operator's voice will not be transmitted.

Figure 4:
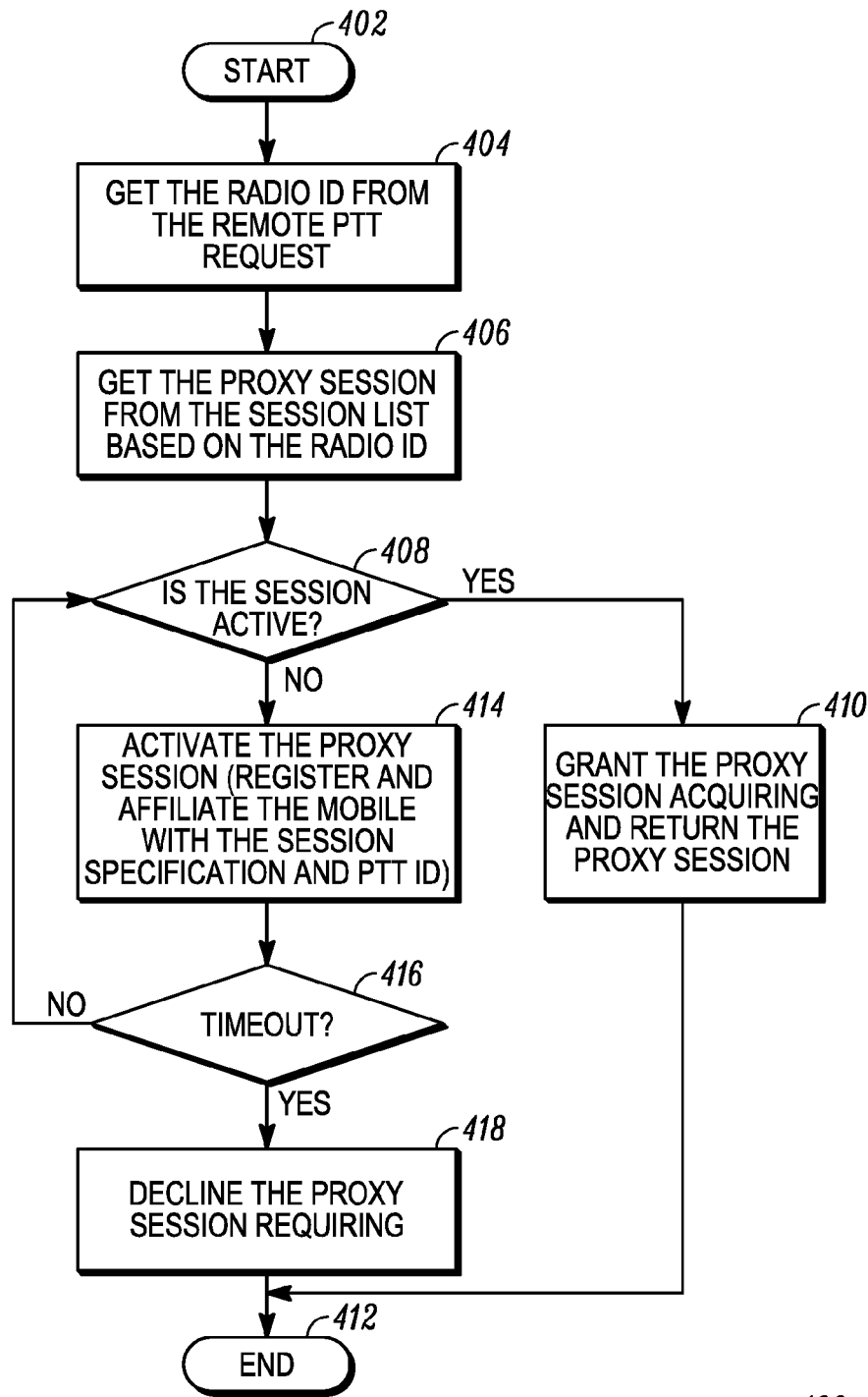
FIG. 4 is a flowchart of a method of acquiring a mobile proxy session while collaborating between a portable two-way radio device and a mobile two-way radio device in accordance with some embodiments.

FIG. 4 is a flowchart of a method 400 of acquiring a mobile proxy session while collaborating between a portable two-way radio device and a mobile two-way radio device in accordance with some embodiments. The method 400 can represent an implementation of step 320 of FIG. 3, and is therefore performed by the mobile two-way radio device. Thus, at the start 402, the mobile two-way radio device has received a PTT request from the portable two-way radio device (314) and the mobile two-way radio device is available to transmit (316). In step 404 the mobile two-way radio device determines the radio identifier of the portable two-way radio device from the PTT request received from the portable two-way radio device over the short range wireless radio network. In step 406 the mobile two-way radio device uses the radio identifier of the portable two-way radio device to acquire the proxy session information. In step 408 the mobile two-way radio device can determine if the proxy session information is active and not "stale." If the proxy session information is active, meaning the portable channel setting if for the same system with which the mobile two-way radio device is presently registered, then the method 400 proceeds to step 410 where the mobile two-way radio device grams the proxy session and returns (e.g. to the controller of the mobile two-way radio device) the proxy session information, whereupon the method 400 terminates. If the proxy session is not active, meaning the portable channel setting if for a different system than the system with which the mobile two-way radio device is presently registered, the in step 408 the method 400 proceeds to step 414 where the mobile two-way radio device registers with the system indicated in the proxy session record associated with the portable two-way radio device that is stored in the mobile two-way radio device. In step 416 a timer is run to allow step 414 to complete, and if the session is not able to be activated (e.g. times out in step 416), then in step 418 the proxy session is declined and the method terminates, and in, for example, step 322 the method 300 with proceed to step 336.

Figure 5:
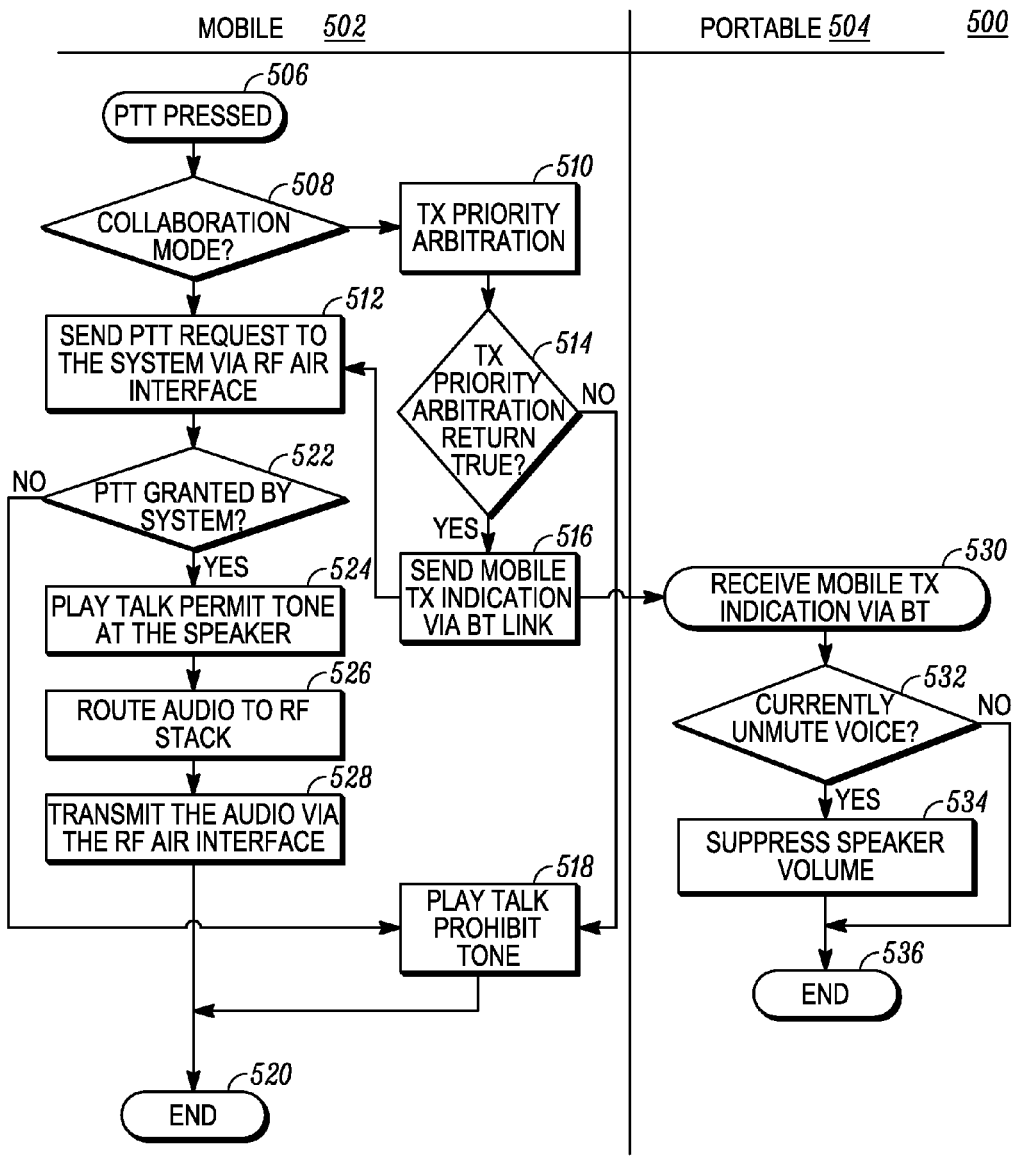
FIG. 5 is a flowchart of a method of handling a mobile PTT event while collaborating between a portable two-way radio device and a mobile two-way radio device in accordance with some embodiments.

FIG. 5 is a flowchart of a method 500 of handling a mobile PTT event while collaborating between a portable two-way radio device 504 and a mobile two-way radio device 502 502 in accordance with some embodiments. At step 506, the PTT button or actuator of the mobile two-way radio device 502 pressed in an attempt by the operator to transmit from the mobile two-way radio device 502. The PTT button remains held for the remainder of the method 500. In step 508 the method 500 determines whether the mobile two-way radio device 502 is presently operating in the collaboration mode. If the mobile two-way radio device 502 is on collaboration mode, the method proceeds to step 510 where the mobile two-way radio device 502 determines whether it is presently proxying for the portable two-way radio device, which is evaluated in step 514. If the mobile two-way radio device 502 is presently transmitting for the portable two-way radio device as a proxy, the method 500 proceeds to step 518 where the talk prohibit tone, or some other means of alerting the operator is provided that indicates the operator cannot presently transmit using the mobile two-way radio device 502, and the method 500 terminates 520. If, in step 514, the method 500 determines that the mobile two-way radio device 502 is available to transmit, the method 500 proceeds to step 516 where the mobile two-way radio device 502 transmits an indication that it is transmitting to the portable two-way radio device over the short range wireless radio network link and proceeds to step 512. In step 512 the mobile PTT request is transmitted over the air via the mobile two-way radio transceiver to the system (e.g. repeater or base station). In step 522 the method determines whether the mobile PTT request has been granted (or denied or timed out). If it is not granted, the mobile two-way radio device plays Talk Prohibit Tone in step 518 and the method 500 terminates 520. If in step 522 the mobile PTT request is granted, (hen conventional mobile two-way radio device 502 operation commences and the talk permit tone can be played in step 524, and the audio from the microphone of the mobile two-way radio device 502 is routed to the RF stack for transmission in step 524, and then it is actually transmitted in step 528 by the mobile two-way radio transceiver.

In step 516 the method 500 also proceeds to step 530 in the portable two-way radio device 504 where the portable two-way radio device 504 receives the indication of the mobile PTT. The portable two-way radio device 504 then determines if its speaker is currently unmuted in step 532. If not, then the method 500 terminates 536. If the speaker in step 532 is currently unmuted, then in step 534 the speaker volume is suppressed so as not to feedback into the mobile microphone, and the method 500 terminates 536.

Figure 6:
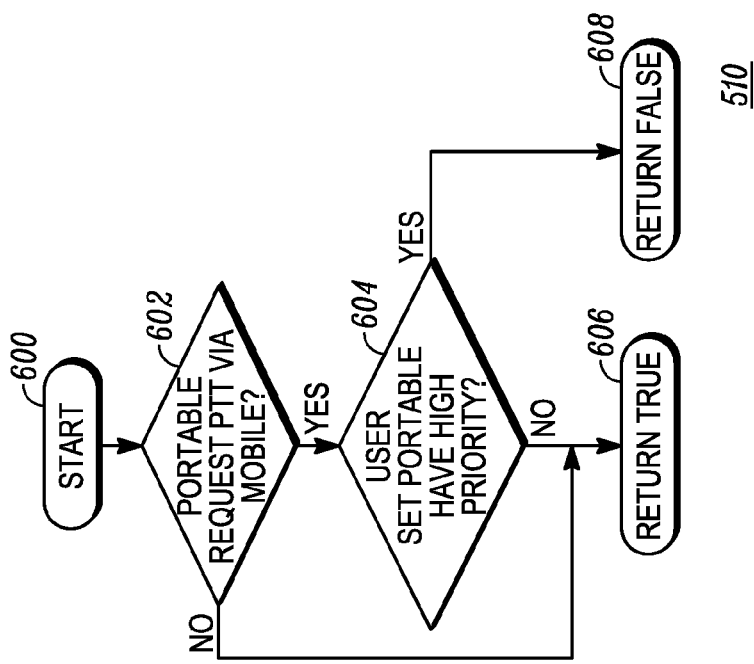
FIG. 6 is a flowchart of a method of performing transmit priority arbitration while collaborating between a portable two-way radio device and a mobile two-way radio device in accordance with some embodiments.

FIG. 6 is a flowchart of a method of performing transmit priority arbitration while collaborating between a portable two-way radio device and a mobile two-way radio device in accordance with some embodiments. The method illustrated, here can be an elaboration of step 510 of FIG. 5. Thus, at the start 600, the PTT button of the mobile two-way radio device has been pressed. In step 602 the mobile two-way radio device determines whether it is presently transmitting as a proxy for the portable two-way radio device. If not, the method terminates by indicates the mobile two-way radio device has transmit priority in step 606. If the mobile two-way radio device is presently acting as a proxy for the portable two-way radio device, then an evaluation is undertaken in step 604 to determine whether the user or operator has set the portable two-way radio device to have priority in such situations. If so, then the method terminates in step 606. Otherwise, if the portable two-way radio device has priority, then the method terminates in step 608 indicating that the mobile PTT request cannot be performed presently, and the method 500 will then proceed from step 514 to step 518. The similar arbitration function is performed in step 316 of FIG. 3. However, the result is reverse comparing to the function shown FIG. 6, that, in step 316 of FIG. 3, the returning "TRUE" means the PTT request is allowed for the portable two-way radio device while "FALSE" means not allowed.

Figure 7:
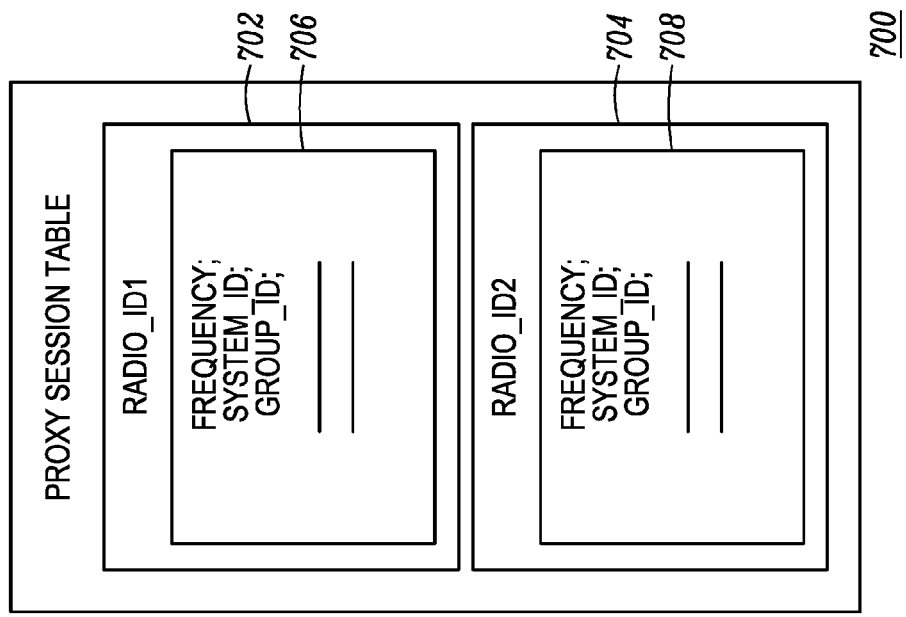
FIG. 7 is a proxy session table maintained by at mobile two-way radio device while collaborating between a portable two-way radio device and a mobile two-way radio device in accordance with some embodiments.

FIG. 7 is a proxy session table 700 maintained by a mobile two-way radio device for facilitating collaboration between a portable two-way radio device and a mobile two-way radio device in accordance with some embodiments. The proxy session table maintains proxy session records for each portable two-way radio device with which the mobile two-way radio device has previously set up a proxy arrangement for collaboration. The proxy session table 700 contains a first proxy session record 702 and a second proxy session record 704, each of which can correspond to different portable two-way radio devices as identified by each portable two-way radio devices radio identifier, such as "Radio_ID1," and "Radio_ID2," respectively. Each proxy record 702, 704 contains session information 706, 708, respectively, which includes, for example, channel setting information such as frequency, the system identifier ("System_ID") of the system to be accessed, and one or more talk group identifiers ("Group_ID"). The proxy session records are accessed, for example, in step 406 of FIG. 4. Each proxy session record also indicates whether it is presently active or inactive, referring to whether the system identifier is the same as that being used by the mobile two-way radio device.

Figure 8:
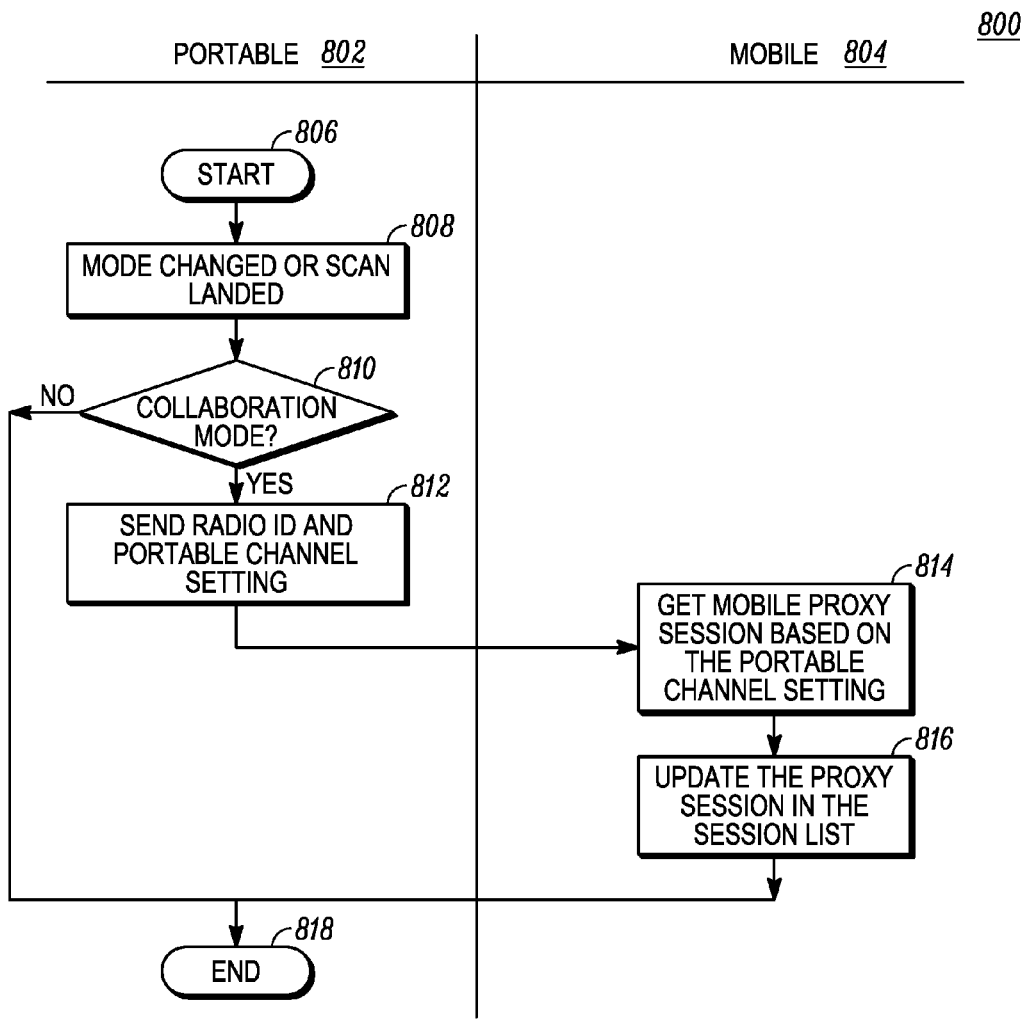
FIG. 8 is a flowchart of a method of performing a proxy session update while collaborating between a portable two-way radio device and a mobile two-way radio device in accordance with some embodiments.

FIG. 8 is a flowchart of a method 800 of performing a proxy session update while collaborating between a portable two-way radio device 802 and a mobile two-way radio device 804 in accordance with some embodiments. At the start 806 the portable two-way radio device 802 is powered on and operational. In step 808 the portable two-way radio device 802 detects a change of mode or scan landing which causes the portable two-way radio device to change is channel setting. In step 810 the portable two-way radio device 802 determines whether it is operating in collaboration mode. If not, then the method simply terminates 818. If in step 810 it is determined that the portable two-way radio device 802 is operating in collaboration mode, then the method 800 proceeds to step 812 where the new portable channel setting is transmitted to the mobile two-way radio device 804 over the short range wireless radio network. In step 814 the mobile two-way radio device 804 receives the portable channel setting and searches the proxy session table (e.g. 700 of FIG. 7) for the corresponding proxy session record, mobile device register portable ID in the portable channel system so the system affiliate a talk group to the portable device. In step 816 the corresponding proxy session record in the proxy session list or table is updated to reflect the new portable channel setting and the method 800 terminates 818.

Figure 9:
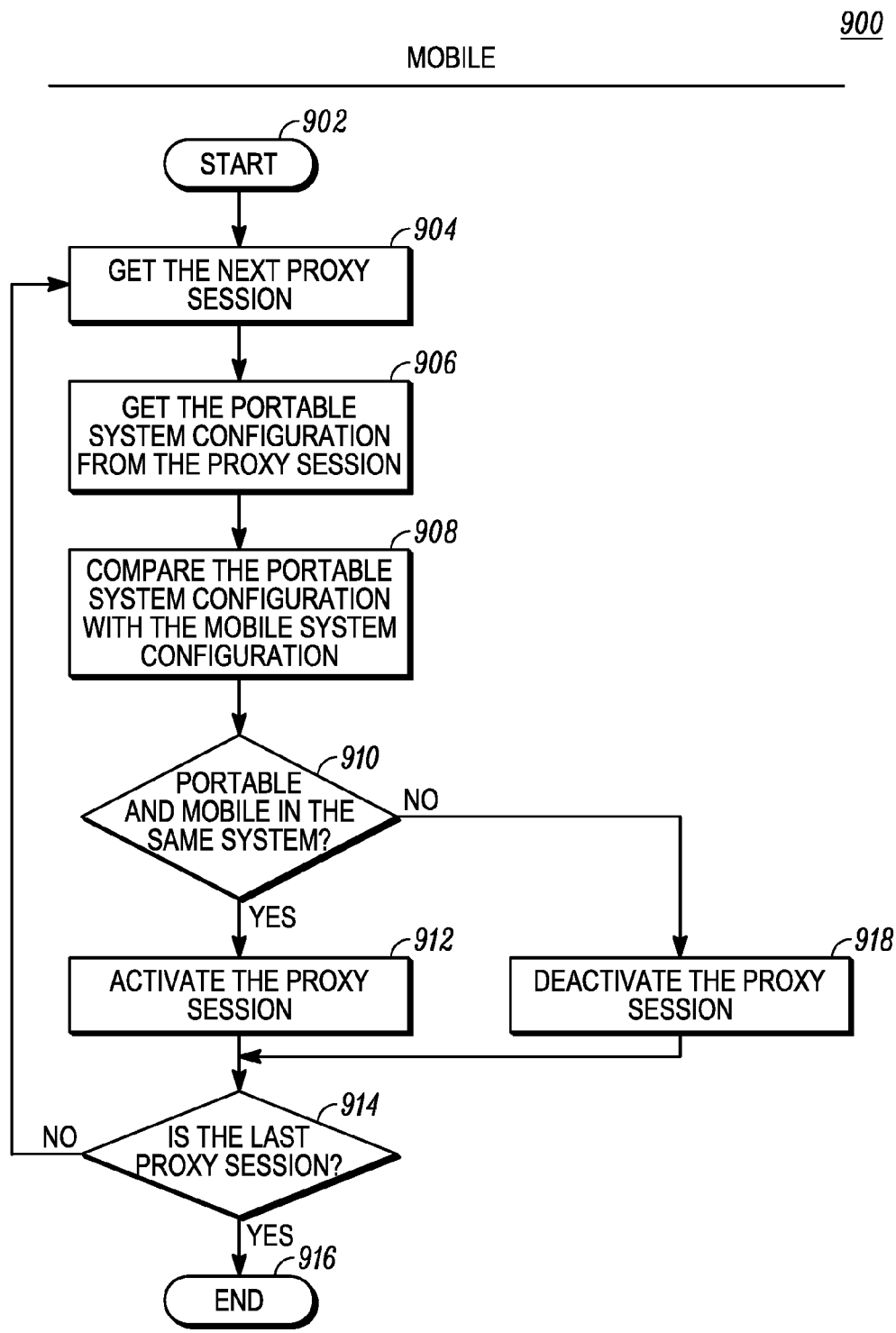
FIG. 9 is a flowchart of a method of performing proxy session management while collaborating between a portable two-way radio device and a mobile two-way radio device in accordance with some embodiments.

FIG. 9 is a flowchart of a method 900 of performing proxy session management while collaborating between a portable two-way radio device and a mobile two-way radio device in accordance with some embodiments. In particular, the mobile two-way radio device will set as active only those proxy sessions that operate on the same system as that presently used by the mobile two-way radio device. Thus, at the start, the mobile two-way radio device is powered on and has initiated the method 900. In step 904 the method 900 commences with the next proxy session record, or the first proxy session record if this is the first iteration of the method 900. In step 906 the method 900 reads the system identifier (configuration) information in the proxy session record. In step 908 the system identifier of the proxy session record being processed is compared to the system identifier with which the mobile two-way radio device is presently registered. In step 910 the result of the comparison in step 908 is evaluated. If the system identifier of the proxy session record is the same as that used presently used by the mobile two-way radio device, the method proceeds to step 912 and the proxy session record being processed is marked as active or activated. If the system identifier of the proxy session record is not the same as that used presently used by the mobile two-way radio device, the method proceeds to step 918 and the proxy session record being processed is marked as inactive or deactivated. In either case, the method 900 proceeds from steps 912, 918 to step 914 where the method 900 determines whether there are more proxy session records to be processed. If so, the method 900 returns to step 904, otherwise the method terminates 916.

Figure 10:
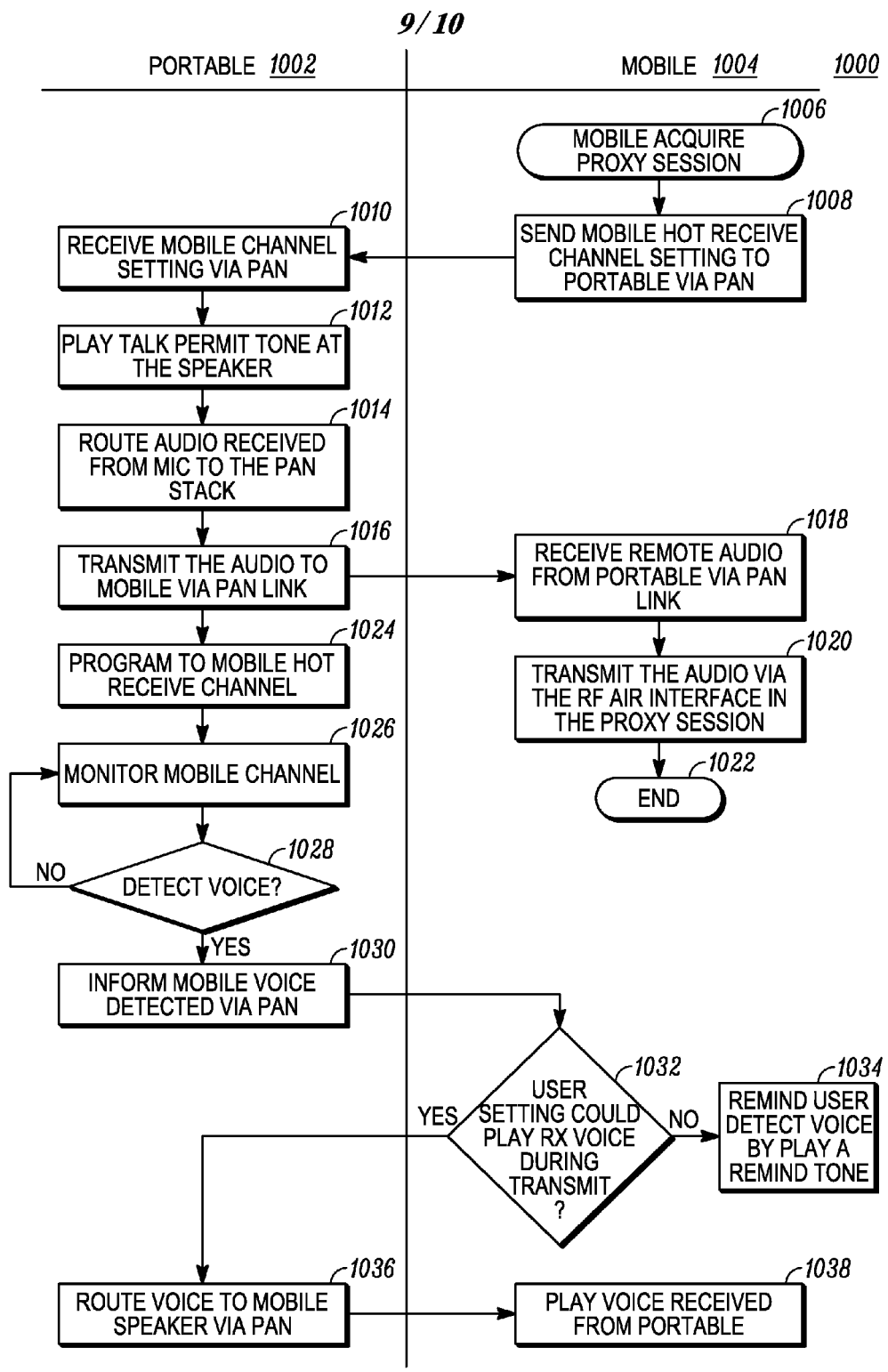
FIG. 10 is a flowchart of a method of performing dual watch operation while collaborating between a portable two-way radio device and a mobile two-way radio device in accordance with some embodiments.

FIG. 10 is a flowchart of a method 1000 of performing dual watch operation while collaborating between a portable two-way radio device 1002 and a mobile two-way radio device 1004 in accordance with some embodiments. Thus, method 1000 is commenced as part of a collaboration event, where the mobile two-way radio device 1004 is acting as a proxy for the portable two-way radio device 1002. Dual watch in the context of the present disclosure refers to using the portable two-way radio device 1002 to receive a signal that the mobile two-way radio device 1004 would ordinarily receive itself but for the fact that it is presently transmitting as a proxy for the portable two-way radio device 1002. Thus, in step 1006, the mobile two-way radio device 1004 acquires the proxy session information for the portable two-way radio device 1002, as in, for example, step 320 of FIG. 3, in step 1008 the mobile two-way radio device 1004 transmits a mobile channel setting to the portable two-way radio device 1002 over the short range wireless network. The mobile channel setting that is transmitted can he a truncated version of the full mobile channel setting and indicate only priority channels. In step 1010 the portable two-way radio device 1002 receives the mobile channel setting over the short range wireless network. In step 1012 the portable two-way radio device 1002 plays the talk permit tone indicating that collaboration is successful and that the operator (who has been pressing the PTT button on the portable two-way radio device 1002 the entire time of method 1000) can speak. In step 1014 audio received at the microphone of the portable two-way radio device 1002 is routed to the short range wireless transceiver. In step 1016 the operator's voice audio is transmitted from the portable two-way radio device 1002 to the mobile two-way radio device 1004 over the short range wireless network. In step 1018 the mobile two-way radio device 1004 receives the audio from the portable two-way radio device 1002, and transmits the audio in step 1020 using the proxy session information corresponding to the portable two-way radio device 1002, which continues until the operator releases the PTT button of the portable two-way radio device 1002 and the method ends 1022.

Additionally, from step 1016, the portable two-way radio device 1002 proceeds to step 1024 where it programs the portable two-way transceiver to the mobile channel setting received in step 1010. In step 1026 the portable two-way radio device 1002 monitors the channel(s) indicated in the mobile channels setting to detect (receive) voice or audio being transmitted on the channel or channels, as indicated in step 1028. The monitoring 1026 and detecting evaluation 1028 continue as long as no voice is received on the mobile channels. If voice is detected, then in step 1030 the portable two-way radio device 1002 informs the mobile two-way radio device 1004 over the short range wireless network in step 1032 the mobile two-way radio device 1004 determines whether it is allowed to play audio, as can be indicated, for example by a user setting. If not, the mobile two-way radio device 1004 can play a remind tone to indicate that there is voice on the mobile channel, which can allow the release the portable PTT button. If the mobile two-way radio device 1004 is capable of playing audio over the speaker, it informs the portable two-way radio device 1002, and in step 1036 the portable two-way radio device 1002 routes the audio received over the mobile channel to the mobile two-way radio device 1004 also over the short range wireless radio network. In step 1038 the mobile two-way radio device 1004 plays the audio received over the mobile channel over a loudspeaker of the mobile two-way radio device 1004. Thus, in step 1038, the mobile two-way radio device 1004 is both transmitting audio on the portable channel that is being received at the microphone of the portable two-way radio device 1002, as well as playing audio that is received by the portable two-way transceiver over a mobile channel.

Figure 11:
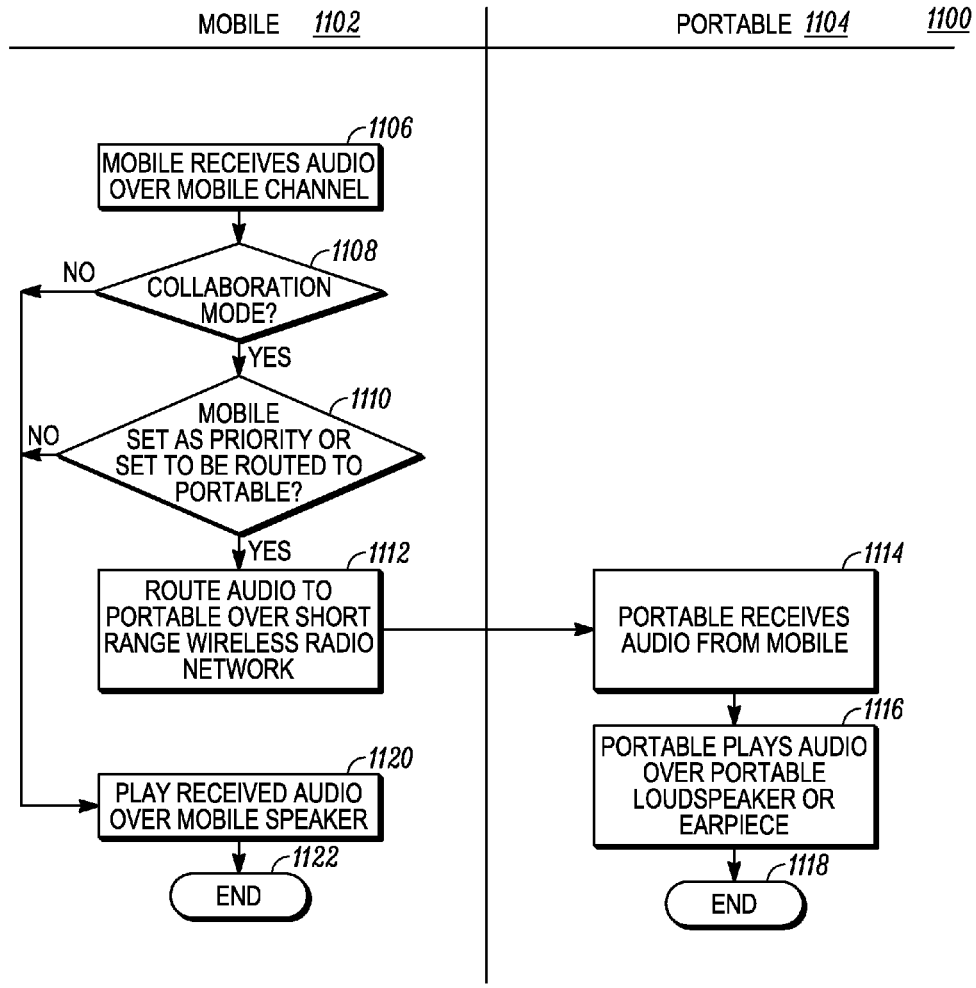
FIG. 11 is a flow chart diagram of a method of collaborating between a mobile two-way radio device and a portable two-way radio device, in accordance with some embodiments.

FIG. 11 is a flow chart diagram of a method 1100 of collaborating between a mobile two-way radio device 1102 and a portable two-way radio device 1104, in accordance with some embodiments. The mobile two-way radio device scans or monitors frequencies or talk groups according to the mobile channel setting. At step 1106 the mobile two-way radio device 1102 receives audio for a talk group or frequency. In step 1108 the mobile two-way radio device 1102 determines whether it is in collaboration mode, and can check whether the mobile two-way radio device is presently paired with the portable two-way radio device 1104. If the mobile two-way radio device 1102 is operating in collaboration mode, then in step 1110 the mobile two-way radio device 1102 can determine if the mobile channel is set or selected as a priority channel, or whether the user has otherwise set the mobile two-way radio device 1102 to route audio to the portable two-way radio device 1104. In step 1112, the mobile two-way radio device 1102 the routes the received audio over the short range wireless radio network to the portable two-way radio device 1104. The short range wireless radio network can be either the PAN or a WLAN connection that allows a somewhat farther distance of separation between the mobile two-way radio device 1102 and the portable two-way radio device 1104. In step 1114 the portable two-way radio device 1104 receives the audio from the mobile two-way radio device 1102. In step 1116 the portable two-way radio device 1104 plays the audio received from the mobile two-way radio device 1102 over a loudspeaker, earpiece, or other audio monitoring device. When no more audio is received, the method 1100 ends 1118.

If in step 1108 the mobile two-way radio device is not in a collaboration mode, or if in step 1110 the user has not set the mobile two-way radio device channel to be a priority or to otherwise route audio to the portable two-way radio device 1104, the mobile two-way radio device 1102 plays the received audio over a speaker associated with the mobile two-way radio device 1102 in step 1120, where upon the audio ceasing, the method 1100 ends. It will be appreciated by those skilled in the art that, while the method 1100 is performing, for example, steps 1108, 1110, among others, the mobile two-way radio device 1102 can, in some embodiments, butler the received audio. In some embodiments, any audio received while performing steps 1108, 1110 can be discarded as the steps can take very little time to perform.

Embodiments of the disclosure provide several benefits. By providing collaboration, the mobile two-way radio device and portable two-way radio device can each be set to different channel settings which allows the user to hear more voice traffic and monitor more channels. This also prevents feedback that occurs when both the mobile and portable two-way radio devices are set on the same channels. Furthermore, by proxy transmitting on behalf of the portable, the user can use the portable normally and since the mobile two-way radio device is performing the transmission, the signal can reach farther distances than that achievable by the portable two-way radio device.

In the foregoing specification, specific embodiments have been described. However, one of ordinary skill in the art appreciates that various modifications and changes can be made without departing from the scope of the invention as set forth in the claims below. Accordingly, the specification and figures are to he regarded. In an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including an amendments made during the pendency of this application and all equivalents of those claims as issued.

Moreover in this document, relational terms such as lint and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that sonic embodiments may be comprised of one or More generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for collaboration among two-way radio devices, comprising:
pairing a mobile two-way radio device and a portable two-way radio device over a short range wireless network link; detecting a push to talk (PTT) event at the portable two-way radio device;
transmitting a PTT request from the portable two-way radio device to the mobile two-way radio device over the short range wireless network link in response to detecting the PTT event,
receiving a PTT grant at the portable two-way radio device from the mobile two-way radio device over the short range wireless network link in response to transmitting the PTT request;
in response to receiving the PTT grant, the portable two-way radio device providing a talk permit alert, opening a microphone receive path, and routing audio received via the microphone receive path to the mobile two-way radio device over the short range wireless network link,
wherein the mobile two-way radio device transmits the audio over a two-way transceiver using a channel setting of the portable two-way radio device, and
wherein the channel setting of the portable two-way radio device is different than a channel setting of the mobile two-way radio device.

2. The method of claim 1, further comprising the portable two-way radio device transmitting to the mobile two-way radio device the channel setting of the portable two-way radio device over the short range wireless network link.

3. The method of claim 2, wherein transmitting the channel setting of the portable two-way radio device is performed while pairing the portable two-way radio device and the mobile two-way radio device.

4. The method of claim 2, wherein transmitting the channel setting of the portable two-way radio device is performed with transmitting the PTT request.

5. The method of claim 1, further comprising the portable two-way radio device transmitting to the mobile two-way radio device a radio identifier of the portable two-way radio device over the short range wireless network link, and wherein the mobile two-way radio device uses the radio identifier of the portable two-way radio device to proxy the portable two-way radio device when the mobile two-way radio device transmits the audio.

6. The method of claim 5, transmitting radio identifier of the portable two-way radio device is performed While pairing the portable two-way radio device and the mobile two-way radio device.

7. The method of claim 1, further comprising:
the portable two-way radio device receiving a mobile channel setting from the mobile two-way radio device; and
while routing audio received via the microphone receive path to the mobile two-way radio device, the portable two-way radio device receiving on a channel indicated in the mobile channel settings, and
the portable two-way radio device routing the audio received on the channel indicated in the mobile channel setting over the short range wireless radio network to the mobile two-way radio device, wherein the mobile two-way radio device plays the audio received by the portable two-way radio device on the channel indicated in the mobile channel setting over a speaker coupled to the mobile two-way radio device.

8. The method of claim 1, further comprising:
receiving, by the mobile two-way radio device, audio on a mobile channel;
determining, in response to receiving the audio on the mobile channel, that the mobile two-way radio device is in a collaboration mode; and
routing the audio to the portable two-way radio device over the short range wireless radio network, wherein the portable two-way radio device plays the audio over a speaker of the portable two-way radio device.

9. A method for collaboration among two-way radio devices, comprising:
pairing a mobile two-way radio device and a portable two-way radio device over a short range wireless network link;
receiving a push to talk (PTT) request from the portable two-way radio device at the mobile two-way radio device over the short range wireless network link;
the mobile two-way radio device transmitting a PTT request over a two-way transceiver on behalf of the portable two-way radio device;
receiving a PTT grant at the mobile two-way radio device in response to transmitting the PTT request;
transmitting the PTT grant to the portable two-way radio device over the short range wireless network link;
receiving audio from the portable two-way radio device over the short range wireless network link, the audio being from a microphone path of the portable two-way radio device; and
the mobile two-way radio device transmitting the audio using a channel setting of the portable two-way radio device on behalf of the portable two-way radio device.

10. The method of claim 9, further comprising the mobile two-way radio device receiving from to the portable two-way radio device the channel setting of the portable two-way radio device over the short range wireless network link.

11. The method of claim 10, wherein receiving the channel setting of the portable two-way radio device is performed while pairing the portable two-way radio device and the mobile two-way radio device.

12. The method of claim 10, wherein receiving the channel setting of the portable two-way radio device is performed with receiving the PTT request.

13. The method of claim 9, further comprising the mobile two-way radio device receiving from the portable two-way radio device a radio identifier of the portable two-way radio device over the short range wireless network link, and wherein the mobile two-way radio device uses the radio identifier of the portable two-way radio device when the mobile two-way radio device transmits the audio.

14. The method of claim 13, wherein receiving the radio identifier of the portable two-way radio device is performed while pairing the portable two-way radio device and the mobile two-way radio device.

15. The method of claim 9, further comprising:
the mobile two-way radio device transmitting a mobile channel setting to the portable two-way radio device;
while receiving audio from the portable two-way radio device microphone path, further receiving audio received by the portable two-way radio device over a channel indicated in the mobile channel setting; and
playing the audio received by the portable two-way radio device over the channel indicted in the mobile channel setting over a speaker coupled to the mobile two-way radio device.

16. The method of claim 9, further comprising:
receiving, by the mobile two-way radio device, audio on a mobile channel;
determining, in response to receiving the audio on the mobile channel, that the mobile two-way radio device is in a collaboration mode; and
routing the audio to the portable two-way radio device over the short range wireless radio network, wherein the portable two-way radio device plays the audio over a speaker of the portable two-way radio device.

17. A portable two-way radio device, comprising:
a portable two-way transceiver;
a short range wireless network transceiver;
wherein the portable two-way radio device pairs with a mobile two-way radio device over a short range wireless network link and detects a push to talk (PTT) event at the portable two-way radio device,
wherein the portable two-way radio device transmits a PTT request to the mobile two-way radio device over the short range wireless network link in response to detecting the PTT event, and
in response to receiving a PTT grant from the mobile two-way radio device over the short range wireless network ink, the portable two-way radio device opens a microphone receive path and routes audio received via the microphone receive path to the mobile two-way radio device over the short range wireless network link;
wherein the channel setting of the portable two-way radio device is different than a channel setting of the mobile two-way radio device.

18. The portable two-way radio device of claim 17, wherein the portable two-way radio device transmits to the mobile two-way radio device the channel setting of the portable two-way radio device over the short range wireless network link.

19. The portable two-way radio device of claim 18, wherein the portable two-way radio device transmits the channel setting of the portable two-way radio device is while pairing the portable two-way radio device and the mobile two-way radio device.

20. The portable two-way radio device of claim 18, wherein the portable two-way radio device transmits the channel setting of the portable two-way radio device with the PIT request.

* * * * *